United States Patent [19]

Gross et al.

[11] Patent Number: 4,585,349

[45] Date of Patent: Apr. 29, 1986

[54] METHOD OF AND APPARATUS FOR DETERMINING THE POSITION OF A DEVICE RELATIVE TO A REFERENCE

[75] Inventors: Daniel Gross, Carouge; Claus Dähne, Onex, both of Switzerland

[73] Assignee: Battelle Memorial Institute, Carouge, Switzerland

[21] Appl. No.: 650,300

[22] Filed: Sep. 12, 1984

[30] Foreign Application Priority Data

Sep. 12, 1983 [CH] Switzerland .......................... 4950/83

[51] Int. Cl.⁴ ...................... G01B 11/14; G01B 11/00
[52] U.S. Cl. .................................... 356/375; 356/372
[58] Field of Search ........................................ 356/375

[56] References Cited

U.S. PATENT DOCUMENTS

| | | | |
|---|---|---|---|
| 3,185,021 | 5/1965 | Thompson | 356/332 |
| 3,664,750 | 5/1972 | Hock | 356/375 |
| 3,794,426 | 2/1974 | Mueller et al. | 356/326 |

FOREIGN PATENT DOCUMENTS 1962515 7/1970 Fed. Rep. of Germany .
2077421A 12/1981 United Kingdom .

Primary Examiner—R. A. Rosenberger
Assistant Examiner—Crystal Cooper
Attorney, Agent, or Firm—Karl F. Ross; Herbert Dubno

[57] ABSTRACT

A method of and an apparatus for determining the location or position of a surface element with respect to a reference which utilizes polychromatic light and with a holographic lens on the light focuses individual wavelengths thereof to respective focal points at one of which the surface element can be located. Light reflected from this surface element is then decomposed into the respective wavelengths and the intensities of these wavelengths are analyzed to determine the wavelength of greatest intensity, this being the wavelength whose focus corresponds to the focus of the surface element. The maximum intensity wavelength is used to determine the position of this focus and hence the position of the surface element with respect to a reference.

14 Claims, 3 Drawing Figures

METHOD OF AND APPARATUS FOR DETERMINING THE POSITION OF A DEVICE RELATIVE TO A REFERENCE

FIELD OF THE INVENTION

Our present invention relates to a method of and to an apparatus for determining the position of an element with respect to some references, e.g. a scale or a point and specifically for the determination by the use of optical means for detecting the position of a surface element which has at least limited reflectivity capability.

The invention is specifically directed to a method of and an apparatus for determining the position of an element utilizing a technique whereby a beam of polychromatic light having a plurality of a light wavelengths is focused such that each wavelength has a respective focal point and the wavelength of the light whose focal point corresponds to the location of the element is detected.

BACKGROUND OF THE INVENTION

Position or displacement sensing devices using optical techniques are known from German patent document (Patent Application-Auslegeschrift) No. 1,962,515 and from British patent document (Published Application) No. 2,077,421.

The German patent document No. 1,962,515 describes an optical distance sensor of the contactless type in which a luminous beam is focused to a plurality of distinct foci. This sensor determines the position of an object which is located between two such foci. In this system, the respective intensities of two light wavelengths reflected by the object and converging at these foci are compared and the position of the object with respect to the sensor is defined when these wavelengths are of equal intensity. The sensor is displaced to obtain such equality. The final position of the sensor fixes the location of the object. The sensor is in effect a hybrid sensor which comprises a mechanical measuring system for establishing its location in space and an optical measuring system for locating the element with respect to the sensor.

The British patent document describes an optical detector and a process for measuring the displacement of an object in which two monochromatic beams of different colors but equal intensities are focused along a common axis. This yields two distinct focal points situated at equal distances from a place of reference. The relative intensities of the respective beams after reflection by the object can then be measured. This relative intensity can be a difference or quotient of the intensities of the light of the two wavelengths and the change in the value of this relative measurement is a function of the displacement of the object from which the two monochromatic rays are reflected.

In both cases, therefore, it is necessary to compare two optical signals and the precision of the measurement and hence of the comparison is a function of the intensities of these signal. As a consequence, the precision and resolving power of the detectors are clearly connected to the optical properties of the surface of the object whose location or position is to be measured and, specifically, the ability of the object to reflect adequate amounts of the different incident light beams. This system is also sensitive to nonlinear variations in light intensity which may cause a disproportionate intensity for two wavelengths upon any variation of source intensity.

OBJECTS OF THE INVENTION

It is the principal object of the present invention to provide an improved method of and apparatus for determining the position of an object using the optical principles mentioned previously but without the drawbacks of earlier systems. A more specific object of this invention is to provide a method of and an apparatus for detecting the position of an object utilizing the selective focusing of different wavelengths whereby the precision and resolving power of the technique is not dependent to a significant extent upon the surface properties of the object whose position is to be detected as long as that object can reflect light to some extent.

SUMMARY OF THE INVENTION

These objects and others which will become apparent hereinafter are attained, in accordance with the present invention, by a method which involves producing a polychromatic beam of light, resolving this polychromatic beam into a plurality of monochromatic rays and focusing said rays at a succession of foci each located at a distance from a reference which is characteristic of the wavelength of that ray, measuring the luminous densities of the wavelength constituting the spectrum and comparing these densities with the densities of reflected rays from an object which can be disposed at a location along the line of foci, and determining the wavelength whose density is maximally reflected, i.e. whose reflected density is in the highest ratio to the incident density or, where the densities of incident light are all the same, which has the highest density, and from this wavelength determining the position of the surface element with respect to the reference scale.

Preferably, therefore, the luminous light beam includes a multiplicity of light rays of different wavelengths and substantially equal amplitudes which derive from a single source which can be disposed in a plane substantially orthogonal to the axis of the beam while means is provided transversely of this axis to resolve the beam into the individual rays and to focus these rays to the respective focal points along the axis. Each focal distance, i.e. distance from a reference which may be the resolving element or device is thus characteristic of the wavelength of a respective ray. An object located at any such focal point will maximally reflect that wavelength and by detecting the reflected wavelength of greatest intensity, we can readily calculate from knowledge of this wavelength, the spacing of the object from the reference. According to a feature of the invention, a portion of the rays constituting the beam reflected by the surface element are selected before decomposing the beam into its spectrum with successive foci.

An apparatus for carrying out the method of the invention can comprise at least one source of polychromatic light generating a beam including a multiplicity of light rays of different wavelength but substantially equal amplitudes, a lens capable of focusing each ray to a distinct focal point characteristic of the respective wavelength, thereby establishing a line of foci upon resolution of the beam into its discrete rays, the surface element whose position is to be measured being disposed along this line.

Means are provided to analyze the spectrum of the beam reflected by the surface element. This means determining the wavelength of the component of this spectrum for which the luminous intensity is a maximum, and means for determining the focal point at which the object is located from the determination may be the ray whose reflected intensity is at a maximum According to a feature of the invention, the focusing lens is a holographic lens with concentric circular lines and this holographic lens can also have concentric elliptical lines and can be placed in a plane inclined with respect to a plane normal to the axis of the luminous beam. In another alternative, the focusing lens for each state of a given wavelength can be a reflective lens having high chromatic aberration and in still another alternative at least one reflective lens can be located between the focusing lens for each luminous ray of given wavelength and the post at which the ray is focused. The apparatus can also comprise a disphragm for selecting a portion of the wavelengths constituting the beam of rays reflected by the surface element.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
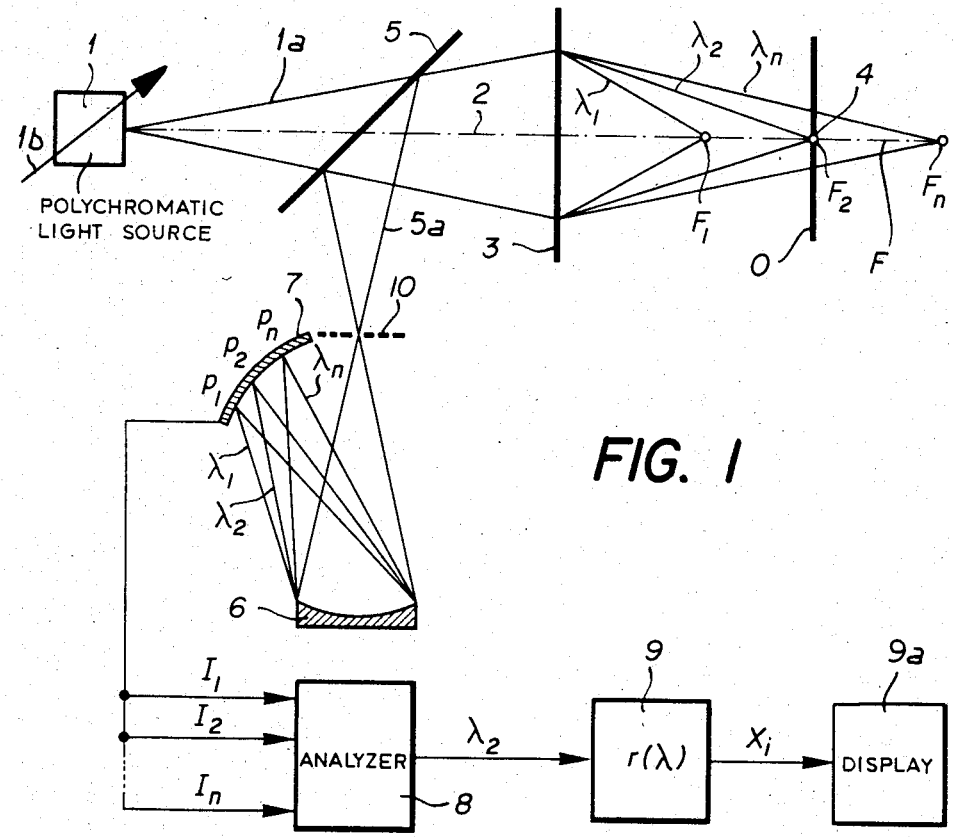
FIG. 1 is a diagram illustrating one embodiment of an apparatus for carrying out the method of the invention.

The apparatus shown in FIG. 1 comprises a polychromatic light source 1 which generates a beam 1a of polychromatic light surrounding an axis 2. This source can be, for example, a tungsten filament lamp, a concentrated arc lamp or the like.

The axis of the beam is trained upon a surface element 4 whose position is to be determined and which is capable of reflecting at least in part any incident light thereon.

A holographic lens with concentric circular lines 3 of known type lies perpendicular to the axis 2 in the path of the beam 1a to resolve this beam into individual rays of respective focal lengths $\lambda_1, \lambda_2 \ldots \lambda_n$ having respective focal points $F_1, F_2 \ldots F_n$ along the axis if one considers only first order diffraction.

The device thus generates a focal line F which intersects the object O at the surface element 4 whose position is to be determined.

For this type of holographic lens the focal distance is, at a first approximation, inversely proportional to the wavelength of the light ray focused thereby.

A beam splitter for the luminous radiation, such as a semitransparent mirror 5 directs the reflected beam from the surface element 4 and focused thereon by the lens 3 as shown at 5a onto a concave diffraction grating 6. This diffraction grating decomposes the reflected spectrum of beam 5a and causes the individual rays of wavelength $\lambda_1, \lambda_2 \ldots \lambda_n$, respectively to converge upon a linear network of photodetectors 7. Each of these photodetectors can be considered to have point-like dimension, i.e. dimension so small that for even focal point $P_1, P_2 \ldots P_n$ on this detector, a respective output $I_1, I_2 \ldots I_n$ representing the light intensity at that point can be outputted. A lattice network or like point photodetector can be a charged-coupled device CCD circuit.

The diffraction grating separates the light rays in accordance with the relationship:

$$a \cdot (\sin \alpha + \sin \beta) = k\lambda$$

where a is the distance separating two lines of the diffraction grating 6, $\alpha$ is the angle of incident of the beam 5a, $\beta$ is the angle of diffraction of the ray of the particular wavelength, k is a whole number (for first order diffractions a=1), and $\lambda$ is the wavelength of the ray contained in the incident beam and focused on the respective point.

The rays of the spectrum of the reflected light, diffracted upon the grate 6 thus converge at points upon the point area of photodetectors $P_1, P_2 \ldots P_n$ which thus receive intensities of which the greatest intensity will be that of the light ray reflected by the object O when the surface element 4 is located at the focal point (e.g. $F_2$) of that ray. In this case, this light ray has a wavelength of $\lambda_2$.

Figure 2:
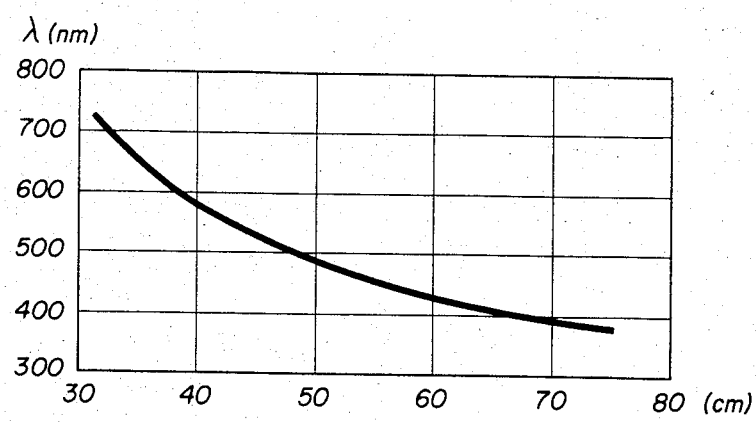
FIG. 2 is an explanatory diagram in the form of a calibration curve.

An analyzer 8, which can be any spectral analyzer, compares the intensities $I_1, I_2 \ldots I_n$ from the photodetectors and delivers a signal representing the wavelength. Here 2, of maximum intensity is a calculating circuit 9 which can have a transfer function corresponding to a calibration curve as shown in FIG. 2 and which produces an output X, representing the distance between the object O and a reference, here the location of the lens 3, from the wavelength $\lambda_2$. The transfer function has been represented at $r(\lambda)$. A display may also be provided as shown at 9a.

In this embodiment only a single light source has been provided although it should be understood that a plurality of light sources can be used, for example side-by-side in a plane substantially perpendicular to the axis 2 of the beam 1a. These sources can be aligned in one or more rows and can each have a respective spectrum of different wavelengths or a single wavelength. In that case, the intensities of the sources can be measured so that the analyzer 8 can receive inputs from such measuring devices as well and determine the relatively most intense reflected ray, i.e. the reflected wavelength whose ratio at its source wavelength is greatest among the wavelengths analyzed.

This system, moreover, allows selection of certain wavelengths to make up the incident beam 1a. Such selectivity has been represented by an arrow 1b through the light source 1.

This arrangement also allows comparison of the respective densities or intensities of a plurality of images each corresponding to a group of zones along one or more rows.

FIG. 2 shows a calibration curve for a holographic lens having 270 concentric circular lines and whose outermost line has a diameter of about 5 mm. The focal distances have been plotted along the abscissa and the wavelengths of the light focused at these distances has been plotted along the ordinate. To obtain this curve it is possible to focus 6 monochromatic light beams of known wavelengths through the same lens to form calibration points, thereby calibrating the lens. A mirror can be placed at each of the focal points to determine the distance for each beam and the position of the mirror is recorded at which the intensity of reflected light is a maximum for each monochromatic source. The preferred monochromatic sources are lasers.

The calculator produces a signal $X=r(\lambda_2)$ which is characteristic of the position of the surface element 4 from a reference point or on a reference scale. While the preferred reference point is the lens 3, any other reference point or reference scale can be provided along the focal line 4 with suitable adjustment of the transfer function $r(\lambda)$.

For certain models of holographic lenses with circular lines it is also possible to measure second order diffractions as well as diffractions of greater than second order.

A second order diffraction focuses a portion of the rays of wavelength $\lambda_1, \lambda_2 \ldots \lambda_n$ at focal point $F_1', F_2' \ldots F_n'$ along a secondary focal line F' located between the focal line F and the lens. The intensity of the rays focused along the line F' is much less than that of the first order focuses along the line F. It is nevertheless possible to analyze the reflected light spectrum for an object disposed at one of these secondary focal point. Consequently, at least two focal ranges can be defined for each holographic lens and two distinct measuring domains can be established for the same detector.

A portion of the light beam emitted by the source 1 is reflected by the holographic lens 3. This parasitic line may be superimposed by the light reflected from the surface element 4 and thus represents a source of single noise which may not be negligible. In a second embodiment of the invention, this problem can be eliminated by replacing the lens 3 having concentric circular line by a lens having concentric lines which are somewhat elliptical and which is inclined at least several degrees with reference to a plane normal to the axis 2 of the beam 1a. This arrangement direct the parasitic reflections from the lens away from the mirror 5 and out of the path of the reflected beam from the surface element 4. Otherwise this device closely resembles the device shown in FIG. 1.

In a third embodiment of the invention a diaphragm 10 having a circular orifice can be disposed between the sensor 5 and the concave diffraction grating 6 of the spectral analysis system to select only a limited portion of the reflected beam containing the wavelength $\lambda_2$.

This diaphragm eliminates at least some of the rays of wavelengths which are not focused on or close to the surface element since these rays appear on the object in the form of disks of a diameter proportional to the distance between the focal point of that ray and the surface element.

In other words by calculating only the centermost portion of the reflected beam we need measure only the most intense zone which includes the same focused on the object and excludes other rays which have focal points more remote. This simplifies the analysis since the diaphragm intercepts most of the reflected rays and thereby accentuates the wavelength $\lambda_2$ focused on the surface element.

A fourth embodiment of the invention can utilize a movable classical optical system having at least one reflective lens and disposed between the holographic lens 3 and the focal range F. This allows a single lens 3 to be used for a variety of different applications because the optical system shifts the line F relative to the lens 3.

In a fifth embodiment of the invention, a reflective lens of high chromatic aberration is utilized in place of the holographic lens 3 to focus the rays of beam 2 on a plurality of focal points $F_1, F_2 \ldots F_n$. The focal range of this reflective lens is obviously much shorter than that of a holographic lens. Consequently, the two types of lenses are complementary.

In a sixth embodiment of the invention, a holographic lens is used with horizontal lines in the form of a cylindrical holographic lens. This type of lens is distinguished from the circular line lens by the form of its focuses, the focuses of the cylindrical holograph lens being in the form of line segments parallel to the lines of the lens.

This embodiment can be used to measure the distance separating two adjacent surface elements a and b which are not coplanar in this case. The spectral analysis of the spectrum of the reflected bean detects the two frequencies $\lambda_a$ and $\lambda_b$ which are focused respectively on the surface elements a and the surface element b. The distance which is determined, therefore, is the difference between the respective distances for the surface elements and the lengths. These distances are determined as previously described using a calibration curve for the parallel-line lens.

This embodiment allows shifting of the position which the focal point is determined and provides an indication of the lateral offset along the line of separation of the surface elements a and b by a comparison of the relative intensities of the wavelengths $\lambda_a$ and $\lambda_b$ reflected by each of the surface elements.

Figure 3:
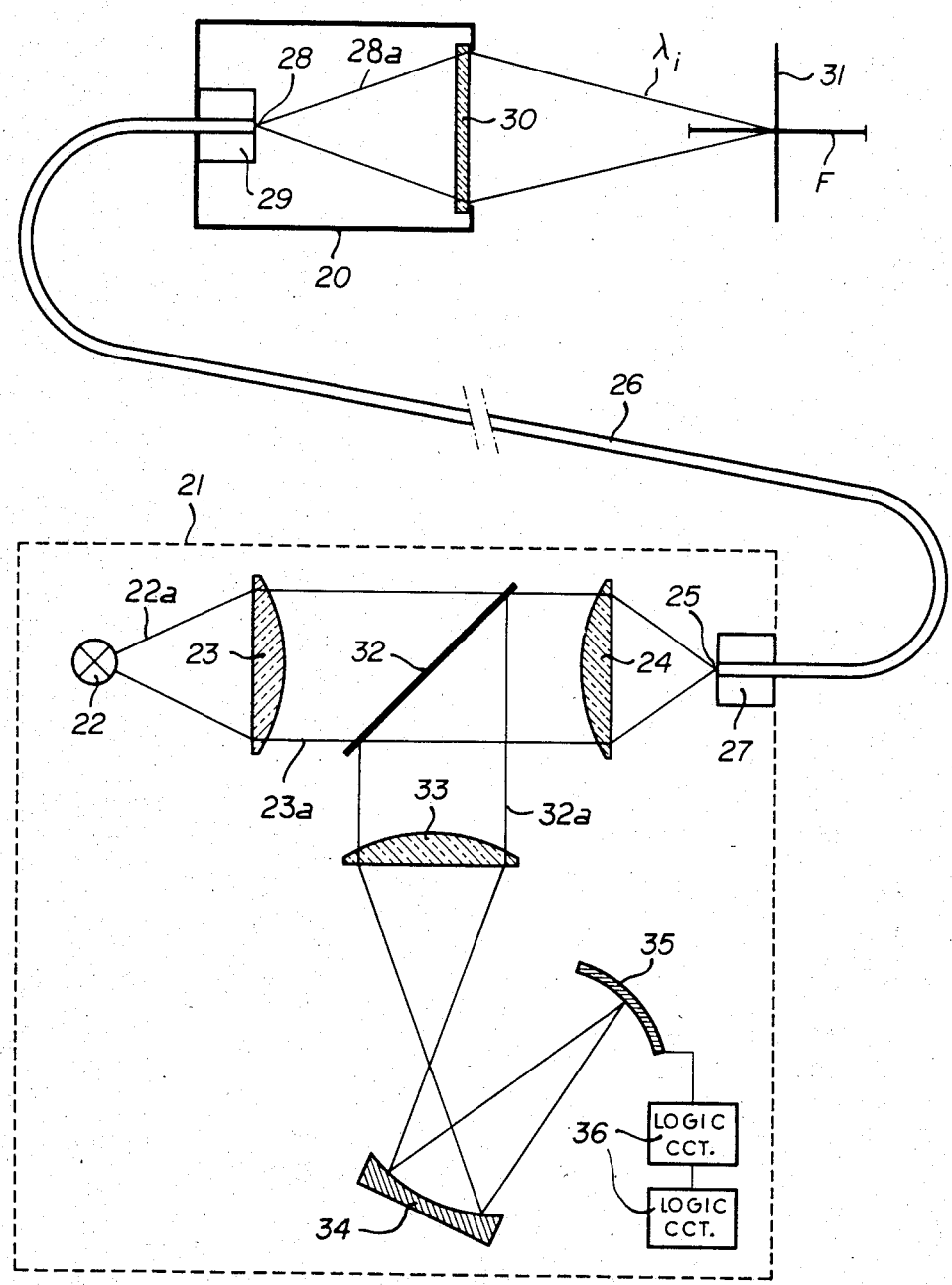
FIG. 3 is a diagram of a second embodiment of the apparatus.

FIG. 3 shows a seventh embodiment of the invention utilizing a multi-mode optical fiber 26 whose core diameter is between about 10 and about 100 microns and which connects a measuring head 20 with an opto-electric system 21.

The system 21 generates a polychromatic beam and analyzes the reflected line from a surface element 31 disposed along a line F representing a measurement range for the position of the surface element 31 to be measured.

The system 21 comprises a polychromatic light source 22 which generates a beam 22a which traverses a first reflective lens, i.e. a condensing lens, which forms the parallel light beam 23a. The light beam 23a traverses the semitransparent motor 32 and is collected by a second reflective lens 24 focusing the beam on the first end 25 of the optical fiber 26 fixed by a connector 27 to the system 21.

A second connector 29 secures the opposite end 28 of the optical fiber 26 in the housing of the measuring head 20. The end 28 thus functions as a point-light-source and directs a light beam 28a onto a holographic lens 30. Thus the light beam 28a incident upon the holographic lens 30, which may be of any of the types previously described, is polychromatic and thus contains rays of wavelengths $\lambda_1$ to $\lambda_n$.

As previously described, the lens 30 focuses each of these rays as a functions of the respective wave length upon the line of foci F and, in the case illustrated, focuses the line of wavelength $\lambda_1$ at the surface element 31 whose position is to be detected.

Similarly, the light reflected from element 31 is focused by the lens 30 at the end 28 of the optical fiber 26. In this case, the end 25 of the optical fiber forms a point source of the reflected rays from the surface element 31 and this reflected radiation is directed by the collimating lens 24 upon the semitransparent mirror disposed between the lenses 23 and 24 and directing the reflected beam, as beam 32a through the reflective convergent lens 33 onto the curved diffraction grating 34 which is analogous to the grating 6 of FIG. 1.

The wavelengths diffracted by the grating 34 are focused at different points on the area of photodetector 35 which is analogous to the area of photodetector 7 of FIG. 1 and can be a CCD.

The electrical signals from the area 35 are processed by the logic circuit 36 which performs the comparison of the spectral analyzer 8 and the calculator 9 of FIG. 1.

It can be noted that in this embodiment, a diaphragm such as the diaphragm of FIG. 1 need not be used because the window formed by the end 28 of the optical fiber 26 has an effect analogous to that of the diaphragm insofar as elimination of unfocused radiation from the surface element is concerned.

For example, it is possible to measure the size of a mechanical object utilizing a device of the invention. In this case, two measuring devices are provided on opposite sides of the piece to be measured so that the width of the piece across the surface elements of the two devices is determined by the relationship:

$$x = d - X_1 - X_2$$

where

X is the dimension sought;

d is the distance separating the two measuring heads which may be of the type shown in FIG. 3;

$X_1$ is the distance separating the piece from the first measuring head; and $X_2$ is the distance separating the piece from the second measuring head.

The measuring devices of the invention also permit dynamic measurement since modifications of the reflected spectrum can be monitored as a function of time. Analysis of the reflected spectrum at regular intervals permits measurement of the displacement of a surface element. This application of the devices of the invention has been found to allow it to be used to measure not only position but also speed or acceleration with great precision, e.g. of an arm of a robot or for a tool or tool holder in a machine tool or other manufacturing machine.

The applications of the devices of the invention which have been mentioned should not be considered to be a complete list since the devices can be used wherever position, distance or movement measurements without contact are desirable.

Furthermore, the spectral analysis system mentioned above is only an example since the skilled worker in the art can adopt any other conventional spectral analysis system to a similar end. It is possible, for example, to use a spectral analysis system comprising a diffraction grating which is given an oscillatory movement for successively directing each diffracted ray or wavelength on a respective unique photodetector or, more commonly, for sequentially directing the diffracted rays upon a single photodetector. In the latter case a sequencing arrangement is required to establish which frequency is impinging upon the photodetector at any time.

When the photodetector thus measured the maximum intensity, the position of the grating represents the position of the surface element along the range of foci of the lens and thus the distance separating the surface element from the measuring head.

In still another spectral analysis system for the reflected light, the diffraction grating can be fixed and the photodetector movable, the principle being the same. Means other than a diffraction grating can be used to decompose the reflected spectrum and by way of example we may mention a dispersion prison on a then later spectral filter.

We claim:

1. A method of measuring the position of a surface element having at least a limited reflectivity capability, comprising the steps of:

generating a polychromatic light beam consisting of a plurality of rays of different wavelengths and substantially the same intensity;

focusing rays of respective wavelengths from said beam along a focal line at respective focal points, said elements lying along said line and reflecting light of at least several wavelengths including a wavelength of greater intensity corresponding to the wavelength whose focal point is substantially at the location of said element;

decomposing reflected light from said surface element into a spectrum of reflected wavelengths;

comparing the intensities of the light of the reflected wavelengths and ascertaining the wavelength of the compared intensities which is a maximum; and establishing from the determination of the wavelengths of the reflected light of maximum intensity the focal point thereof and hence the position of said element with respect to a reference.

2. The method defined in claim 1, further comprising the step of selecting a part of the reflected light from said element and decomposing only that part into said spectrume of reflected wavelengths.

3. The method defined in claim 1 wherein the position of said element is established by passing a signal from a spectral analyzer for the reflected light from said surface element into a circuit having a transfer function calibrating said signal in terms of position.

4. An apparatus for measuring the position of a surface element having at least a limited reflectivity capability, comprising means for generating a polychromatic light beam consisting of a plurality of rays of different wavelengths and substantially the same intensity; means including at least one lens for focusing rays of respective wavelengths from said beam along a focal line to respective focal points, said element lying along said line and reflecting light of at least several wavelengths including a wavelength of greater intensity corresponding to the wavelength whose focal point is substantially at the location of said element; means for decomposing reflected light from said surface element into a spectrum of reflected wavelengths; and means for analyzing said spectrum of reflected wavelengths for determining the wavelength thereof whose luminous intensity is the maximum and thereby determining the position in space of the focal point corresponding to the reflected wavelength of maximum intensity and hence the position of said element with respect to a reference.

5. The apparatus defined in claim 4 wherein said lens is a holographic lens with concentric circular lines.

6. The apparatus defined in claim 4 wherein said lens is a holographic lens with concentric lines of elliptical form disposed in a plane inclined at a plane normal to the axis of said beam.

7. The apparatus defined in claim 4 wherein said lens is a reflective lens having a high degree of chromatic aberration.

8. The apparatus defined in claim 4, further comprising an optical system including at least one reflective lens between the first mentioned lens and said line of focal points.

9. The apparatus defined in claim 4, further comprising a diaphragm for selecting only a portion of the reflected light from said surface element for decomposition and analysis.

10. The apparatus defined in claim 4, further comprising an optical fiber for conducting reflected light from said surface element.

11. The apparatus defined in claim 10 wherein said optical fiber has a small window excluding a portion of the light reflected from said surface element.

12. The apparatus defined in claim 11 wherein said lens is provided in an optical measuring head at which said optical fiber terminates, said source being provided at a location spaced from said head.

13. The apparatus defined in claim 12 wherein said source includes a light source and a pair of lenses for collimating said beam and focusing said beam on an end of said optical fiber.

14. The apparatus defined in claim 4, further comprising a beam splitter in the path of said beam for diverting light reflected from said element to said means for decomposing said spectrum of reflected wavelength.

* * * * *